United States Patent [19]

Krüger

[11] Patent Number: 4,717,200
[45] Date of Patent: Jan. 5, 1988

[54] SLIDING LINER FOR A SLIDING ROOF FOR AUTOMOBILES

[76] Inventor: Peter Krüger, Hermann-Ehlersstrasse 100, 6450 Hanau 7, Fed. Rep. of Germany

[21] Appl. No.: 876,564

[22] Filed: Jun. 20, 1986

[30] Foreign Application Priority Data

Aug. 2, 1985 [DE] Fed. Rep. of Germany ....... 3527839

[51] Int. Cl.$^4$ ............................................. B60J 7/10
[52] U.S. Cl. .................................... 296/214; 296/211; 296/216; 49/63; 98/2.14
[58] Field of Search ............... 296/211, 214, 216, 218; 49/62, 63; 52/200; 98/2.02, 2.12, 2.13, 2.14

[56] References Cited

U.S. PATENT DOCUMENTS

| 3,084,737 | 4/1963 | Stevens | 49/63 X |
| 4,312,533 | 1/1982 | Jardin et al. | 296/214 |
| 4,337,975 | 7/1982 | Tamamushi et al. | 296/218 X |
| 4,606,574 | 8/1986 | Kwan | 296/218 |

FOREIGN PATENT DOCUMENTS

| 3131803 | 2/1983 | Fed. Rep. of Germany | 98/2.02 |
| 3242097 | 5/1983 | Fed. Rep. of Germany | 296/218 |
| 0686910 | 9/1979 | U.S.S.R. | 98/2.14 |

Primary Examiner—Robert B. Reeves
Assistant Examiner—Russell D. Stormer

[57] ABSTRACT

A sliding liner for a sliding roof for automobiles, where a rigid, possibly transparent lid closes a roof opening in its closed position and is slidably guided on lateral guide rails mounted on the fixed roof portion, on which rails also guide channels are provided for the lateral edges of the sliding liner. The sliding liner is displaceable independently of the rigid sliding lid and is furnished with ventilation openings. The sliding liner is formed rigidly as a plate or frame and is equipped, in the region of its forward edge, with a grip depression, the adaptation of the sliding liner to different surface forms and constructions of the remaining lining of the automobile is facilitated in that, in the region of the forward edge of the sliding liner, a ventilation strip is detachably fixed, on which a grip is formed.

3 Claims, 6 Drawing Figures

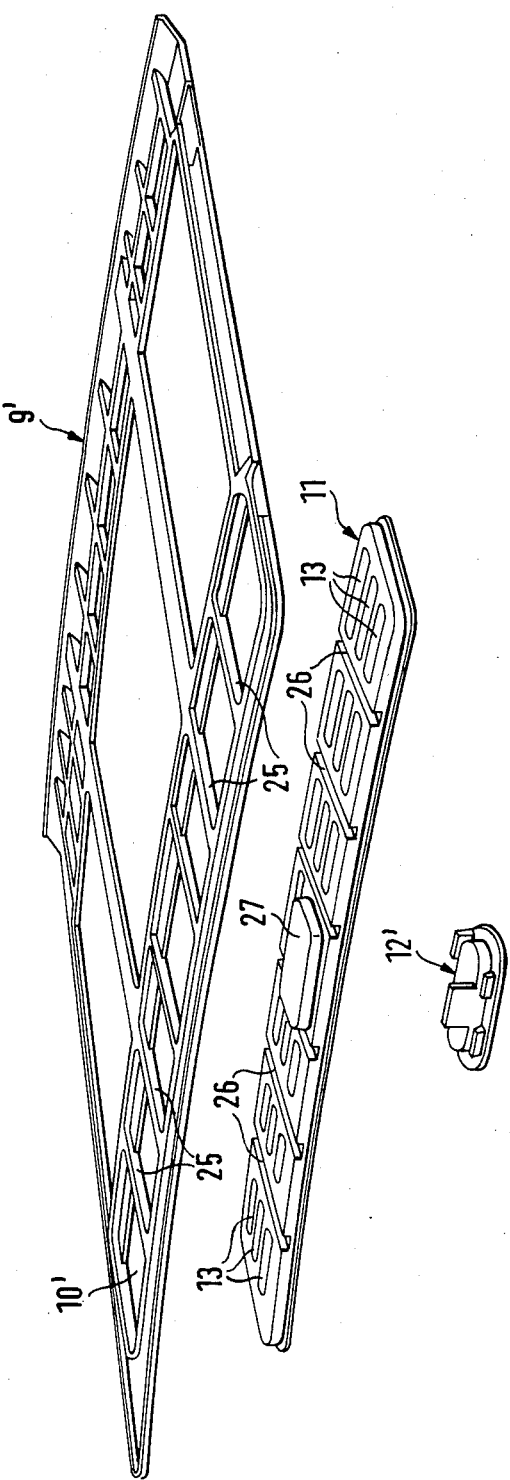

SLIDING LINER FOR A SLIDING ROOF FOR AUTOMOBILES

FIELD OF THE INVENTION

This invention relates to a sliding liner for a sliding roof for an automobile.

BACKGROUND OF THE INVENTION

Sliding liners are used in known sliding roof constructions including in so-called sliding-lifting roofs, and cover the inner face of the lid of the roof when the roof is closed. Sliding liners are used with lids made from sheet metal and also with glass lids. They have the function, with lid opened or, in the case of glass lids, even with the lid closed, of attenuating the light incidence and regulating the ventilation. Since the sliding liner is visible from the automobile interior, it needs to be adapted in its surface characteristics, or at least in its colour, to the remaining interior roof lining of the vehicle.

DESCRIPTION OF THE PRIOR ART

In one known sliding roof (DE-GM 17 64 915), a sliding liner, described there as a lining lid, is provided, which is illustrated as plate-shaped without ventilation openings, but in practice has been constructed as a sheet metal frame covered with an air-permeable fabric, by which it is possible to adapt it to the surface characteristics of the remaining vehicle liner. The ventilation with the sliding lid opened and sliding liner closed in this case takes place through the fabric covering. The intensity of ventilation, however, is determined by the structure of the fabric, is thus limited and therefore usually insufficient.

In a further known sliding roof (DE-PS No. 29 23 888), a rigid sliding liner manufactured from a transparent material is provided for a rigid lid for closing a roof opening, the liner being slidably guided on lateral guide rails mounted on a fixed roof portion, on which also are provided guide channels for side edges of the sliding liner. This liner is slidable independently of the rigid lid, is equipped with ventilation openings, is constructed rigidly as a plate or frame and is equipped in the region of its forward edge with a grip depression. This construction facilitates adequate ventilation, because it is furnished with ventilation slits over its entire area, but as a result the adaption of the sliding liner to the surface form and construction of the remaining automobile lining is not possible. In order to adapt the colour to the surrounding covering of the automobile roof, a separate sliding liner of appropriate colour needs to be manufactured for each given colour of the roof lining. Covering with a fabric or the like is not possible because this would not permit access to the recesses of the grip depression and the ventilation slits.

It is an object of the present invention to provide a sliding liner which, even when closed, facilitates adequate ventilation of the vehicle interior and can be adapted to the surface nature and construction of the remaining interior vehicle lining, without needing to allow for the presence of the ventilation openings.

SUMMARY OF THE INVENTION

According to one aspect of the present invention, there is provided a sliding liner for a sliding roof for an automobile, the liner being slidable independently of a rigid sliding lid of the sliding roof and having in the region of a forward edge thereof, a ventilation strip which is detachably fixed thereto, on which ventilation strip a grip means is formed.

According to a second aspect of the present invention, there is provided a sliding liner which is essentially in accordance with the preceding paragraph in combination with a sliding roof for an automobile, said sliding roof having a substantially rigid lid which closes a roof opening in its closed position and is slidably guided on lateral guide rails fitted to a fixed roof portion, on which rails are also provided guide channels for lateral edges of the sliding liner. Preferably, the substantially rigid lid of the sliding groove is transparent.

In the present sliding liner, the ventilation strip and the sliding liner are initially separate components, so that the plate-like or frame-like sliding liner can be adapted to the surface nature of the automobile lining, for example by covering with a plastics foil having the same colour as the remaining vehicle lining or by covering with plastics flakes, without regard needing to be paid to the ventilation openings or the grip depression. The plate or frame of the sliding liner can be manufactured in a neutral colour and either covered with fabrics or foils of various colours or electrostatically flake-coated in various colours. The ventilation strip, in contrast, can be manufactured in various colours, which presents fewer difficulties in that it is a much smaller component than the entire sliding liner. Consequently, manufacture and storage are considerably simplified and made less expensive, which is a very important advantage compared to the state of the art, because mass produced components are involved.

Preferably, an especially rapid fitting of the ventilation strip to the sliding liner can be made possible by the ventilation strip being fixed to the sliding liner by detent connections or clips.

Preferably, an elongate opening is provided along the forward edge of the sliding liner, into which the ventilation strip, adapted thereto in its dimension, is inserted. Consequently, the ventilation strip does not protrude in a disturbing manner from the sliding liner.

In order to hold and restrain it properly, the ventilation strip can be provided, at its front and rear edges, with a groove, into which the associated edges of the opening engage. Fixing can be carried out in that the ventilation strip is first pushed with its one edge onto the associated edge of the opening, whereupon the groove of the other edge is engaged onto the associated edge of the opening.

In order to counteract possible weakening of the sliding liner by the opening formed therein, it may be advantageous for the elongated opening to be interrupted at a plurality of positions by ribs connecting its front to its rear edge, which engage into corresponding channels in the upper face of the ventilation strip.

The arrangement may be such that the grip depression is provided in the centre of the ventilation strip and ventilation openings are provided on either side of the grip depression.

In another embodiment, in contrast, the ventilation strip can be formed substantially as a dish-like grip depression throughout its entire length, in which ventilation openings are situated. In this embodiment, no specially formed grip depression is provided at the centre of the ventilation strip, with the result that the ventilation strip can be used virtually along its entire length as a hand-hold for sliding actuation of the sliding liner.

In a further embodiment the grip depression can be manufactured as a separate component and be clipped into an associated recess of the ventilation strip.

In order to assure adequate ventilation functioning of the ventilation strip, it is advantageous if the ventilation openings situated in the ventilation strip are slit-shaped in known manner and are situated in the underside of the ventilation strip, which is substantially flush with the underside of the sliding liner.

Adequate ventilation is, however, ensured if the underside of the ventilation strip, generally flush with the underside of the sliding liner, is constructed as a plate, in which spaced bores are provided forming ventilation openings.

A further favourable possibility of forming ventilation openings consists in the ventilation openings being situated in at least one longitudinal wall of the ventilation strip, formed throughout as a dish-like grip depression, with the openings being in the form of spaced bores.

If, in this arrangement, the rear longitudinal wall of the ventilation strip is used for accommodating the bores, then these bores are largely invisible to the occupants of the vehicle, with the result that the ventilation strip appears to the viewer as a smooth-surfaced element.

For an especially effective ventilation, the slit-shaped ventilation openings can be formed by S-shaped ribs.

For the flush fitting of the ventilation strip to the sliding liner it is advantageous if the ventilation strip is furnished with a peripheral flanged edge, which rests upon a set-back, peripheral edge of the opening in the sliding liner.

The ventilation strip can be formed, in economical manner, as a plastics injection moulding. The sliding liner itself may be constructed either in one piece as a sheet steel plate or as a frame, or indeed as a glass fibrereinforced plate or frame. A closely ribbed grating is also suitable for its construction in order to minimise weight.

BRIEF DESCRIPTION OF THE DRAWINGS

For a better understanding of the invention and to show how the same may be carried into effect, reference will now be made, by way of example, to the accompanying drawings, in which:

FIG. 6 is a perspective view from above of another embodiment of the sliding liner.

DESCRIPTION OF THE PREFERRED EMBODIMENTS

Figure 1:
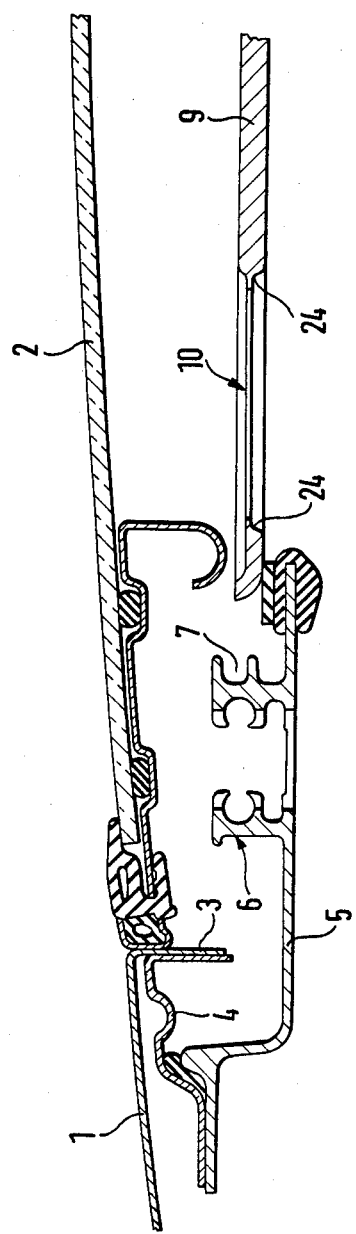
FIG. 1 is a longitudinal section through part of a forward frame arrangement of a sliding roof, showing a glass lid closed and a sliding liner closed.

From FIG. 1, the forward region of a fixed automobile roof 1 can be seen, in which a roof opening, closable by a transparent lid 2, is situated. A reinforcing frame 4 is connected to a downward flange 3 of the roof 1, which bounds the roof opening, a sliding roof frame 5 being fixed in turn to this reinforcing frame. The sliding roof frame 5 carries a guide rail 6, which is provided in appropriate form also on the lateral parts of the sliding roof frame 5, not illustrated. The lateral guide rails guide the lid 2 in known manner, by guide shoes connected to the lid and engaging into the guide rails. Also, actuating elements (not shown) for the lid 2 are guided on the guide rails.

The guide rail 6 possesses also, in its two lateral regions, a guide channel 7 for the lateral edges 8 (FIG. 2) of a sliding liner 9, which can be displaced independently of the lid 2.

In the region of the front edge of the sliding liner 9, an opening 10 is situated for receiving a ventilation strip 11, not shown in FIG. 1. In the example illustrated shown in FIGS. 1 and 2, the sliding liner 9 consists basically of a closed plastics panel.

Figure 2:
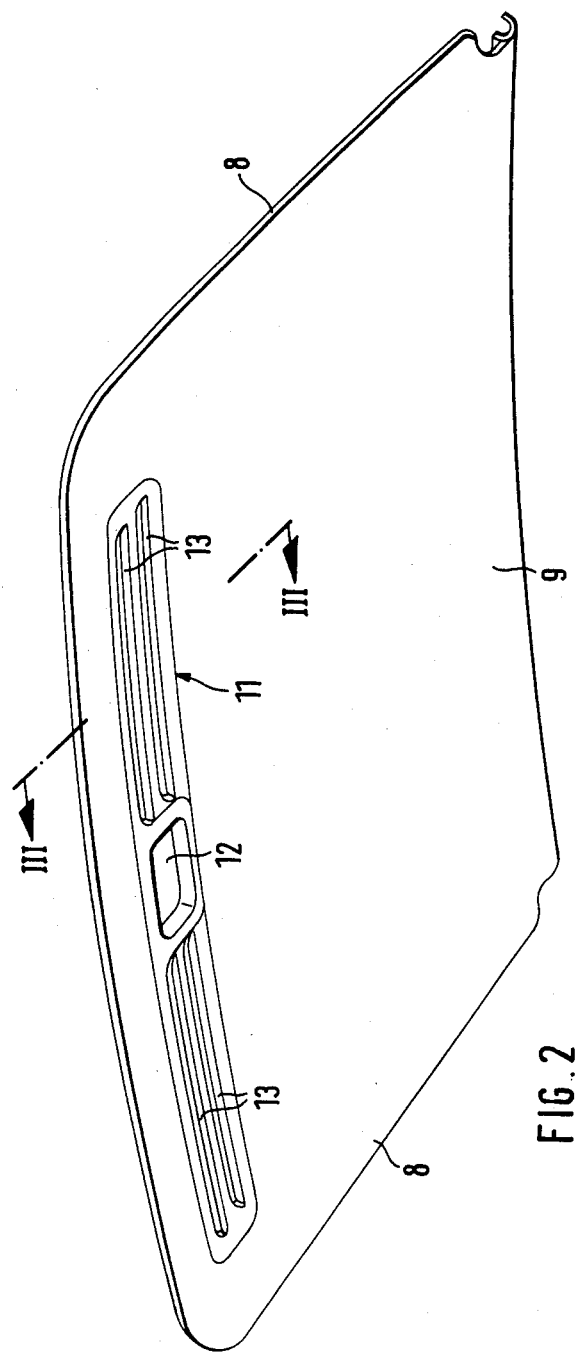
FIG. 2 is an underneath perspective view of the sliding liner.
Figure 3:
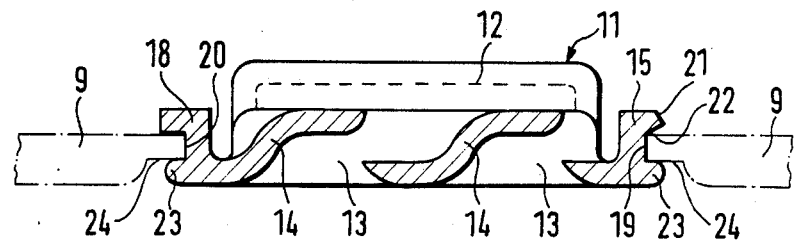
FIGS. 3 to 5 are cross-sections through differently constructed ventilation strips taken along the line III—III in FIG. 2.

The ventilation strip 11 illustrated in FIGS. 2 and 3, as in all the other examples as well, is constructed as a plastics injection moulding. At its centre there is a moulded grip depression 12, whereas in its two regions on either side of the grip depression 12, slit-shaped ventilation openings 13 are formed, constituted by S-shaped ribs 14 (FIG. 3). Whereas the two front slit-shaped ventilation openings 13 are bounded on either side by S-shaped ribs, the two rear slit-shaped ventilation openings 13 are each bounded by one S-shaped rib 14 and the rear edge 15 of the ventilation strip 11.

Figure 4:
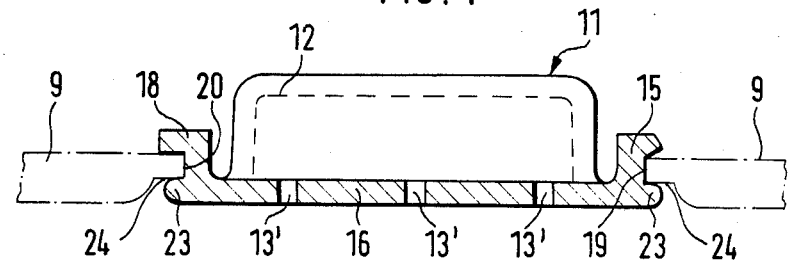

In the embodiment shown in FIG. 4, the underside of the ventilation strip 11 is formed as a plate 16, in which ventilation openings 13' in the form of spaced bores are situated.

Figure 5:
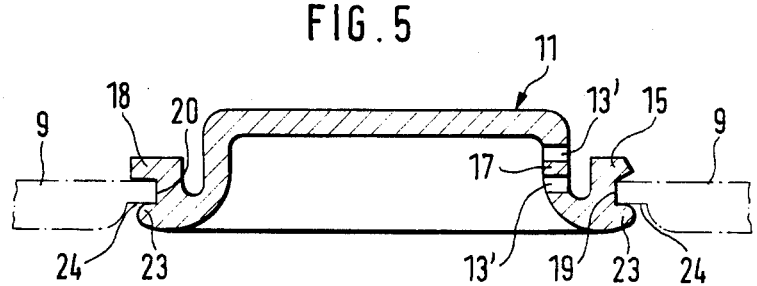

In the embodiment shown in FIG. 5, the ventilation strip 11 is formed continuously as a dish-shaped grip depression and possesses, at its rear longitudinal wall 17, once again ventilation openings 13' in the form of spaced bores.

The examples of ventilation strip 11 illustrated in FIGS. 3 to 5 are the same in various aspects. Thus, for example, the ventilation strips 11 possess at their rear edges 15 and their forward edges 18, a groove 19, 20 respectively, into each of which the associated edge of the opening 10 in the sliding liner 9 engages, with the result that the ventilation strip 11 is securely held to the sliding liner 9. The rear edge 15 is provided with inclined surfaces 21 and 22 for snap engagement with the associated edge of the opening. The fixing of the ventilation strip 11 constructed in this way to the sliding liner 9 is carried out from below, by first pushing the groove 20 onto the associated opening edge of the sliding liner 9, then pivoting the ventilation strip 11 upwards until the inclined surface 21 meets the other edge of the opening. Since the edges 15 and 18 can deform elastically to a sufficient extent, a moderate application of force causes engagement of the groove 19 onto the associated edge of the opening. The inclined surface 22 facilitates, in reverse, the disengagement operation, if the ventilation strip 11 has to be removed.

A further common feature of the three examples of embodiment consists in that the undersides of the ventilation strips 11 are flush with the underside of the sliding liner 9, so that the ventilation strips do not project downwards to form a nuisance. Furthermore, the ventilation strips 11 each possess a peripheral flanged edge 23, which bears upon a recessed peripheral edge 24 of the opening 10.

In the example shown in FIG. 6, a frame-like sliding liner 9', ribbed on its upper face, is provided, the front opening 10' of which, intended for seating the ventilation strip 11, is interrupted by a plurality of ribs 25, serving for stiffening. Channels 26, situated in the upper face of the ventilation strip 11, correspond to these ribs 25, and these channels seat the ribs 25 when the ventilation strip 11 is placed in the opening 10'. By the provision of the channels 26, the slit-shaped ventilation openings 13 are interrupted several times. The grip depression 12' is, in this case, a separate component, which is designed to be clipped into an opening 27 of the ventilation strip 11.

I claim:

1. In a sliding roof for an automobile having a rigid sliding lid and a sliding lever that improvement consisting of:

a ventilation strip including a groove, detachably secured at its forward end to said sliding liner by means of detent means;

said sliding liner having an elongated opening along its forward edge into which said ventilation strip is inserted; said detent means comprising a flange along the opening to engage the groove of the ventilation strip;

said ventilation strip having a plurality of channel in the upper face thereof;

said liner having a plurality of ribs extending across said elongated opening at a plurality of positions corresponding to the positions of said channels to engage said channels when said ventilation strip is secured to said liner;

said ventilation strip being formed substantially over its entire length as a continuous depression in which ventilation openings are provided;

grip means provided at about the center of said ventilation strip;

said ventilation openings in said ventilation strip being located on both sides of said grip means; and the underside of said ventilation strip being substantially flush with the underside of said sliding liner.

2. A sliding liner and sliding lid as claimed in claim 1 wherein said ventilation openings are constructed as spaced pores in the ventilation strip.

3. A sliding liner and sliding lid as claimed in claim 1 wherein said grip means is a separate component clipped into a recess of said ventilation strip and said ventilation means is provided with said recess to receive said grip means.

* * * * *